Aug. 2, 1966 — R. C. COLLINS — 3,263,665

POWER DRIVEN ABRADING TOOL

Filed Jan. 22, 1964

INVENTOR.
ROBERT C. COLLINS
BY

United States Patent Office 3,263,665
Patented August 2, 1966

3,263,665
POWER DRIVEN ABRADING TOOL
Robert C. Collins, 746 NE. 67th St., Miami, Fla.
Filed Jan. 22, 1964, Ser. No. 339,387
3 Claims. (Cl. 125—5)

This invention relates in general to abrading devices and more particularly to a rotary tool for abrading various surfaces when rotated by a conventional portable power drill.

Prior power abrading tools driven by an electric power drill required universal compensation between the abrading contact elements and the chuck or coupling in which the tool is secured.

One prior device of this general character employed flexible rubber coupling means which has proved to be unsatisfactory due to rapid deterioration and the difficulty in obtaining the proper axial pressure compensation between the tool and the source of rotary power. Other compensating devices, such as a conventional universal joint have been used and were not only relatively more expensive but subject to rapid deterioration as a result of pivotal wear when operated in the presence of abrasive dust.

The present invention overcomes the above objections and disadvantages by the provision of a multi-disc abrading tool in which the coupling means between the power source and the tool comprises a conical driving spring secured in the tool and terminating in an integral shank for engagement in the chuck or collet of the source of rotary power and is a principal feature of the invention.

A further object of the invention is the provision of a body member having a plurality of independent coaxial groups of abrading discs journalled for rotation on axes extending radially from the axis of rotation of the body member and including a conical spring secured to the body for rotating same substantially about said axis.

Another object of the invention is the provision of a flexible coupling for a multi-disc abrading tool comprising a helical spring having one end threaded into said tool and the opposite end thereof terminating in a shank for power rotation.

Figure 1:
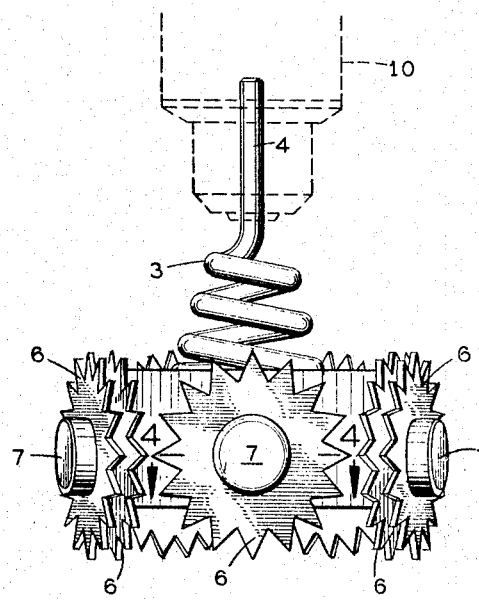
Figure 2:
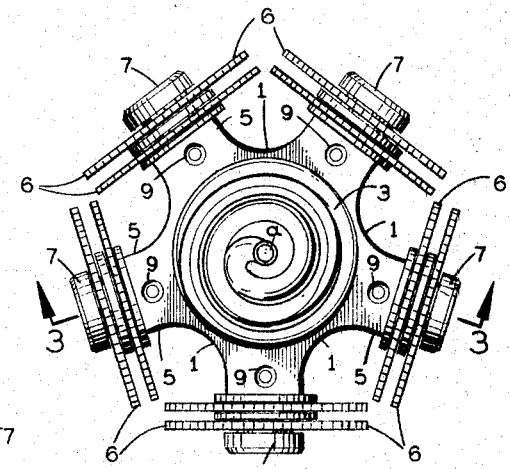
Figure 3:
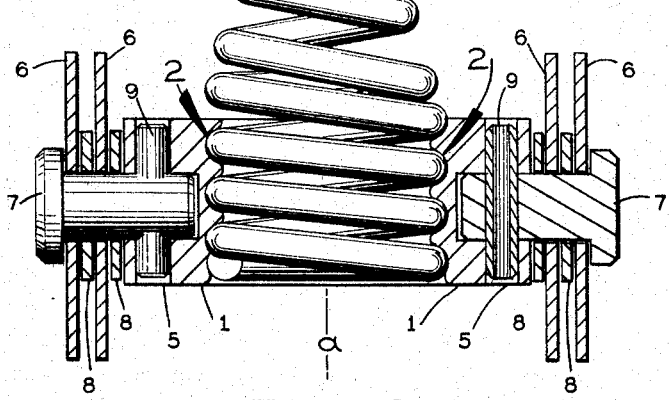
Figure 4:
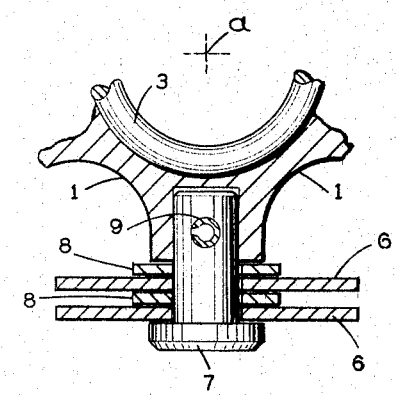

These and other objects and advantages in one embodiment of the invention are shown and described in the following specification and drawing, in which:

FIG. 1 is a side elevation of the tool.
FIG. 2 is a plan view of the tool shown in FIG. 1.
FIG. 3 is an enlarged cross sectional elevation taken through section lines 3—3, FIG. 2.
FIG. 4 is an enlarged fragmentary cross sectional plan view of the tool shown in FIG. 1.

Referring to FIG. 1, a body 1 has a bore therethrough with an internal thread 2 formed therein for mating and retaining a helical compensation spring 3. The spring is preferably made from circular spring steel wire of uniform cross section and the lower portion thereof is threaded into intimate contact with the thread in the body as shown in FIG. 3. The upper portion of the spring is formed into a convergent cone terminating in a shank portion 4. The spring and the body are concentric with relation to axis a—a, as shown in FIG. 3. The body member in this embodiment has five like integral bosses 5 equi-spaced in radial relation and normal to axis a—a.

Each boss 5 is bored in radial relation to axis a—a with the axis of each bore in a plane normal to the axis a—a, as shown. A pair of toothed abrading discs 6 is retained for rotation on a shaft or stud 7 in each of the five bores in the bosses 5 with spacer washers 8 positioned between each boss and the inner disc 6 and between the inner disc 6 and the outer disc 6 as shown.

Each boss and stud therein is cross bored to receive a retaining pin 9 therethrough preferably a self retaining rollpin for retaining each stud 7 in proper position for the free rotation of disc 6 thereon.

Since the rotation of the chuck in conventional power drills is counter clockwise facing the chuck, the helix of the spring 3 is formed in a right hand direction and the end thereof abuts a stop means in the body 1, not shown. Thus when the shank is turned in a clockwise direction facing the end thereof, the spring will tend to be retained in the body in its full threaded position regardless of counter acting shock loads when the tool is operated.

In use the shank 4 of the abrading tool is secured in a chuck 10, shown in dotted lines in FIG. 1, which chuck is a part of a power drill not shown, then when the chuck is rotated by a power drill, not shown, the entire device will rotate substantially about axis a—a. Since the lower end of the teeth in all of the discs are in a single plane they will abrade planar surfaces on a wide variety of materials, such as the removal of paint or the smoothing of irregularities in concrete. During the abrading operation the spring 3 will compensate for reasonable misalignment of the normal position of the chuck with respect to the surface being abraded.

A principal advantage of the spring coupling in the device resides in self alignment when the axis of the chuck is tilted with respect to the body.

It is to be understood that the discs 6 may be made of a wide variety of materials depending upon the surface being abraded; however, for general use hardened tool steel has been found satisfactory and for abrading harder surfaces, such as concrete, it has been found that blades made from tungsten carbide or equal material have a greater life.

It is to be noted that special shanks may be secured to the upper end of the spring as an alternate to the integral shank as shown.

It is also apparent that the replacement of worn blades is accomplished by removing studs 7 by first extracting the pins 9.

It is understood that certain modifications in the construction, utilizing the features described, are intended to come within the scope of the appended claims.

Having described my invention, I claim:

1. A rotary abrading tool comprising a body member having a bore therein for retaining a coupling means, a helical spring coupling secured by one end portion thereof in said bore coaxial therewith and the opposite end thereof terminating in a straight shank substantially coaxial with said bore, a plurality of shafts secured in and projecting from the outer periphery of said body with the axes thereof in equi-spaced radial relation to the said axis of said bore and in a plane normal thereto, releasable retaining means for holding said shafts within said body, a like plurality of like abrading discs journalled for rotation on each of said shafts whereby the latter will rotate and abrade a substantially planar surface in contact therewith when said shank is rotated.

2. A rotary abrading tool comprising a body member substantially balanced for rotation about a main axis, said body having a threaded bore therein coaxial with said axis for retaining a coupling, a coil spring having one end portion threaded into said threaded bore and the opposite end thereof terminating in an integral straight shank substantially coaxial with said axis, said spring comprising a single resilient element, a plurality of like groups of adjacent abrading discs of like number and diameter journalled for independent free rotation on said body about axes corresponding to said groups in radial relation to said axis and in a plane normal thereto whereby said discs will independently rotate and abrade a surface in contact therewith when said shank is rotated and said spring permitting said shank means to tilt with respect to said axis.

3. A rotary abrading tool comprising a body member having a threaded bore therein for retaining a coupling means, a spring coupling comprising a helical portion at one end thereof threaded into said bore, said spring coupling comprising a single resilient element, and said helical portion conically convergent to a straight integral shank substantially coaxial with said bore, a plurality of shafts secured in and projecting from said body with the axes thereof in equi-spaced radial relation to the said axis of said bore and in a plane normal thereto, a like plurality of like abrading discs journalled for rotation on each of said shafts whereby the latter will rotate and abrade a substantially planar surface in contact therewith when said shank is rotated.

References Cited by the Examiner

UNITED STATES PATENTS

| | | | |
|---|---|---|---|
| 1,104,564 | 7/1914 | Snyder | 306—20 |
| 1,230,842 | 6/1917 | Berg | 125—3 |
| 1,377,537 | 5/1921 | Wimmer | 125—3 |
| 2,439,921 | 4/1948 | Brown | 306—20 |
| 2,542,579 | 2/1951 | Sanders | 306—20 |
| 2,801,432 | 8/1957 | Randrup | 29—81.11 |

HAROLD D. WHITEHEAD, *Primary Examiner.*